(12) United States Patent
Herzberger et al.

(10) Patent No.: US 12,017,770 B2
(45) Date of Patent: Jun. 25, 2024

(54) ELECTRIC-PROPULSION AIRCRAFT COMPRISING A CENTRAL WING AND TWO ROTATABLE LATERAL WINGS

(71) Applicant: EENUEE, Saint-Etienne (FR)

(72) Inventors: Erick Herzberger, Annecy (FR); Benoît Senellart, Chambery (FR)

(73) Assignee: EENUEE, Saint-Etienne (FR)

( * ) Notice: Subject to any disclaimer, the term of this patent is extended or adjusted under 35 U.S.C. 154(b) by 91 days.

(21) Appl. No.: 17/784,640

(22) PCT Filed: Dec. 3, 2020

(86) PCT No.: PCT/FR2020/052277
§ 371 (c)(1),
(2) Date: Jun. 11, 2022

(87) PCT Pub. No.: WO2021/123540
PCT Pub. Date: Jun. 24, 2021

(65) Prior Publication Data
US 2023/0007869 A1 Jan. 12, 2023

(30) Foreign Application Priority Data

Dec. 19, 2019 (FR) ...................................... 1914887

(51) Int. Cl.
*B64C 39/10* (2006.01)
*B64C 3/56* (2006.01)
(Continued)

(52) U.S. Cl.
CPC ................ *B64C 39/10* (2013.01); *B64C 3/56* (2013.01); *B64C 35/006* (2013.01);
(Continued)

(58) Field of Classification Search
CPC ..... B64C 39/10; B64C 2039/105; B64C 3/56; B64C 3/40; B64C 35/001
See application file for complete search history.

(56) References Cited

U.S. PATENT DOCUMENTS 1,316,280 A 9/1919 Curtiss
3,762,355 A 10/1973 Raynes
(Continued)

FOREIGN PATENT DOCUMENTS

CN 110182353 A 8/2019
JP 2018167792 A 11/2018
(Continued)

*Primary Examiner* — Timothy D Collins
*Assistant Examiner* — Eric Acosta
(74) *Attorney, Agent, or Firm* — Harris Beach PLLC (57) ABSTRACT

An aircraft includes a central wing accommodating passengers and/or freight and two lateral wings that pivot on the central wing about respective axes of rotation. The various wings obey the following geometric characteristics: $0.3 \times L_{ong} < L_{arg} < L_{ong}$, $0.11 \times L_{ong} < H_{aut} < 0.25 \times L_{ong}$, $E_{nv} > 1.4 \times L_{ong}$, wherein $L_{arg}$ being the distance between the two axes, $L_{ong}$ being the length of the central wing, $H_{aut}$ being the height of the central wing, $E_{nv}$ being the wingspan of the aircraft. The axes of rotation are inclined by an angle relative to the vertical axis of the aircraft such that the lateral pivot from rear to front and vice versa so as to come closer to, or deploy on either side from, the fuselage.

11 Claims, 7 Drawing Sheets

(51) Int. Cl.
    *B64C 35/00*             (2006.01)
    *B64D 11/00*            (2006.01)
    *B64D 17/00*            (2006.01)
    *B64D 27/40*            (2024.01)
    *B64C 1/14*             (2006.01)

(52) U.S. Cl.
    CPC ............ B64C 35/008 (2013.01); B64D 11/00 (2013.01); B64D 17/00 (2013.01); B64D 27/40 (2024.01); *B64C 1/1407* (2013.01)

(56) References Cited

U.S. PATENT DOCUMENTS

| | | | | |
|---|---|---|---|---|
| 4,080,922 A | * | 3/1978 | Brubaker | B63B 1/322 |
| | | | | 114/282 |
| 5,984,231 A | * | 11/1999 | Gerhardt | B64C 5/04 |
| | | | | 244/49 |
| 7,234,667 B1 | * | 6/2007 | Talmage, Jr. | B64C 39/024 |
| | | | | 244/120 |
| 2019/0276135 A1 | | 9/2019 | Van Merkensteijn, IV | |
| 2019/0359330 A1 | | 11/2019 | Zhao | |

FOREIGN PATENT DOCUMENTS

| | | |
|---|---|---|
| RU | 2668000 C1 | 9/2018 |
| WO | 2017098374 A1 | 6/2017 |

* cited by examiner

ELECTRIC-PROPULSION AIRCRAFT COMPRISING A CENTRAL WING AND TWO ROTATABLE LATERAL WINGS

RELATED APPLICATIONS

This application is a § 371 application of PCT/FR2020/052277 filed Dec. 3, 2020, which claims priority from French Patent Application No. 1914887 filed Dec. 19, 2019, each of which is incorporated herein by reference in its entirety.

TECHNICAL FIELD OF THE INVENTION

The present invention relates to an electric-propulsion aircraft including a central wing and two rotatable lateral wings. It applies in particular to the air transport of passengers or freight.

BACKGROUND OF THE INVENTION

Very diverse airplane architectures coexisted until 1945, in particular large seaplanes. The advent of jet engines as well as the increased reliability of the airplanes have led to a single architecture being chosen. An oblong fuselage of the generally cylindrical type with two lateral wings and empennages constitutes the mostly retained formula in the post-war period. Speed being the mainly sought feature, everything has been designed so that the aircraft is displaced as quickly as possible, in particular to cross the Atlantic. From this trend, the architecture will be standardized with the objective of a speed of 800 to 1000 km/h (below the sound barrier). Paved runways of 2 to 4 kilometers in length are the norm at airports, which must therefore be adapted, and the planes are pressurized in order to fly at more than 10,000 meters in altitude.

Manufacturers of fixed wing airplane (as opposed to helicopters) find themselves globally confronted with four basic technical needs, namely flying fast, taking off and landing over increasingly shorter distances, accommodating passenger, being displaced over increasingly longer distances. Added to this are economic and ecological constraints.

The use of powerful motors provides a response to the need to fly fast, but they will reduce the distance traveled. The drag, essentially due to friction in the air, constitutes an obstacle/brake to overcome. It is therefore necessary to reduce as much as possible the outer surface of the airplane (wet surface), in particular that of the wing and that of the fuselage.

With regard to the need to be able to take off and/or land over short distances, the weight of the airplane, the surface of the wing and some appendages (flap or high-lift slat type) are the essential parameters.

The need to accommodate the desired number of passengers (or even freight) is obviously related to the size of the aircraft and the layout of the cabin thereof. In this field, many efforts have been performed to optimize the ratio number of passengers/size of the cabin, but the limits are no doubt close to being reached for an optimum flight comfort.

Finally, concerning the possibility of carrying out significant long-distance flights, the maximum distances traveled are obtained by flying the aircraft at its maximum fineness ratio (lift-to-aerodynamic drag ratio) and at the lowest possible total weight. In theory, the maximum fineness ratio is obtained when the friction drag is equal to the induced drag (drag induced by the lift). And its value increases by reducing both drag types.

The most often adopted aircraft architectures are as follows:

the cylinder/cigar type fuselage architecture with two lateral wings. This architecture responds globally and for decades to the need for flights over long distances at subsonic speed. But it generated major drawbacks. The wings thereof have low lift surfaces, requiring large airports and leading to numerous logistics and boarding complexities. The wings also have a limited span in order to park easily at the terminals and be displaced on the ground with the least possible difficulty. Some large-capacity airplane models, for example, have required heavy airport development/redevelopment in various countries. The small size of the fuselage, needed to reduce the drag, and the substantially circular section thereof, supporting the pressurization, make life on board sometimes very uncomfortable (feeling of suffocation, risk of claustrophobia, complicated displacements for staff and passengers, complex cabin layouts). The concentration of the weights carried in the fuselage in relation to the small dimensions lead to a very high empty weight. The empty weight to take-off weight ratio is often comprised between 0.5 and 0.6, which means that nearly 50% of the propulsion power (related to the consumption of carried fuel) is not used for transporting passengers;

the architecture called flying wing architecture, generally of (very) large span, including an arrow to solve the problems of longitudinal stability. The generated drag is the lowest and this solution offers better fineness ratio. The passengers are housed in the thickness of the wing profile, but the wing span must be considerably enlarged.

However, the ground operations are not very easy. The non-cylindrical passenger compartment volumes also make the construction of the structure more complex. Finally, due to a good weight distribution, the empty weight to take-off weight ratio is approximately 0.4;

the mixed architecture, called "Blended Wing Body" (BWB) architecture has been studied in particular for transonic flight, with a central wing (Body) and fixed lateral wings (Wings). A BWB type aircraft architecture has been proposed in the U.S. Pat. No. 6,264,136 B1 including lateral wings whose incidence is variable relative to the central wing (Body).

Moreover, seaplanes experienced few improvements after the Second World War. The aerodynamic drag generated by the devices necessary for the operation on water, such as hull and stepped fuselages, as well as floats, have limited the development of this type of apparatuses for commercial aviation. Recently, solutions for taking off and landing on water thanks to hydrofoils have been proposed in the patents FR 2 902 079 and FR 2 970 699.

However, all these aircraft are not yet optimized with regard to their aerodynamics, their stability, their compactness, their flight speed, their operating radius, their possibility of taking off/landing over short distances or their useful load.

OBJECT AND SUMMARY OF THE INVENTION

The present invention aims at overcoming these drawbacks with a totally innovative approach in particular in terms of architecture and proportions.

To this end, according to a first aspect, the present invention relates to an aircraft including a main fuselage composed of a central wing accommodating passengers and/or freight, two lateral wings pivoting on the central wing about respective axes of rotation, the various wings obeying the following geometric characteristics:

$L_{arg}$ being the distance between the two axes of rotation of the pivoting lateral wings,
$L_{ong}$ being the length of the central wing,
$H_{aut}$ being the height of the central wing,
$E_{nv}$ being the wingspan of the aircraft,
characterized in that:

$$0.3 \times L_{ong} < L_{arg} < L_{ong},$$

$$0.11 \times L_{ong} < H_{aut} < 0.25 \times L_{ong},$$

$$E_{nv} > 1.4 \times L_{ong}, \text{ and}$$

the axes of rotation of the lateral wings are inclined by an angle β relative to the vertical axis Z of the aircraft, such as 10°<β<50°, such that the lateral wings pivot from rear to front and vice versa so as to come closer to the main wing, or be deployed on either side therefrom.

The invention is implemented according to the embodiments and variants set out below, which are to be considered individually or according to any technically operative combination.

Advantageously, the lateral wings each include at least one aerodynamic control surface.

According to a particular embodiment of the present invention, the lateral wings pivot about their respective axes of rotation between a first extreme deployed flight position and a second extreme folded storage position of the aircraft, the amplitude of the angle Ω between these two extreme positions being approximately 70°.

In a complementary manner, the lateral wings pivot about their respective axes of rotation between a first extreme deployed flight position and a second deployed intermediate take-off and/or landing position, the amplitude of the angle Ω between these two positions being approximately 40°.

According to a preferred embodiment of the present invention, the aircraft includes at least one pylon above the central wing supporting at least one electric and/or thermal propulsion and integrating at least one aerodynamic control surface.

According to a particularly interesting aspect of the present invention, the aircraft includes at least two hydrofoils below the central wing and which are retractable in the said central wing.

Preferably, the aircraft is equipped with at least one door at the rear and/or at the front of the central wing.

Advantageously, the aircraft is provided with at least one cockpit on the top of the central wing and located at the height of the lateral wings.

According to a complementary feature of the present invention, the aircraft includes an emergency parachute inside the central wing.

BRIEF DESCRIPTION OF FIGURES

Other advantages, aims and features of the present invention emerge from the following description made, for explanatory and not limiting purposes, with reference to the appended drawings, in which.

DESCRIPTION OF EMBODIMENTS

FIGS. 1 to 7 represent an aircraft 100 in accordance with the present invention, preferably with electric or hybrid propulsion.

This aircraft 100 includes a central wing 1, forming a fuselage for the transport of passengers and/or freight, and two lateral wings 2 and 2'. These wings can pivot about respective axes of rotation 3 and 3' to take different positions which will be described later.

The general shape of the aircraft 100, and in particular of the wings 1, 2 and 2', is of a known type, and obeys the following geometrical considerations:

$L_{arg}$ is the distance between the two axes of rotation 3 and 3' of the pivoting lateral wings 2 and 2',
$L_{ong}$ is the length of the central wing 1,
$H_{aut}$ is the height of the central wing 1,
$E_{nv}$ is the wingspan of the aircraft 100, According to the present invention, these geometric characteristics must meet the following conditions:

$$0.3 \times L_{ong} < L_{arg} < L_{ong},$$

$$0.11 \times L_{ong} < H_{aut} < 0.25 \times L_{ong},$$

$$E_{nv} > 1.4 \times L_{ong}.$$

The two axes 3 and 3' located in transition zones 4 and 4' between the central wing 1 and the lateral wings 2 and 2', allow pivoting each of the lateral wings 2 and 2'. The axes 3 and 3' are located in these zones 4 and 4' with high thickness so as to support the lift forces generated by the lateral wings 2 and 2' on the fuselage.

Figure 1:
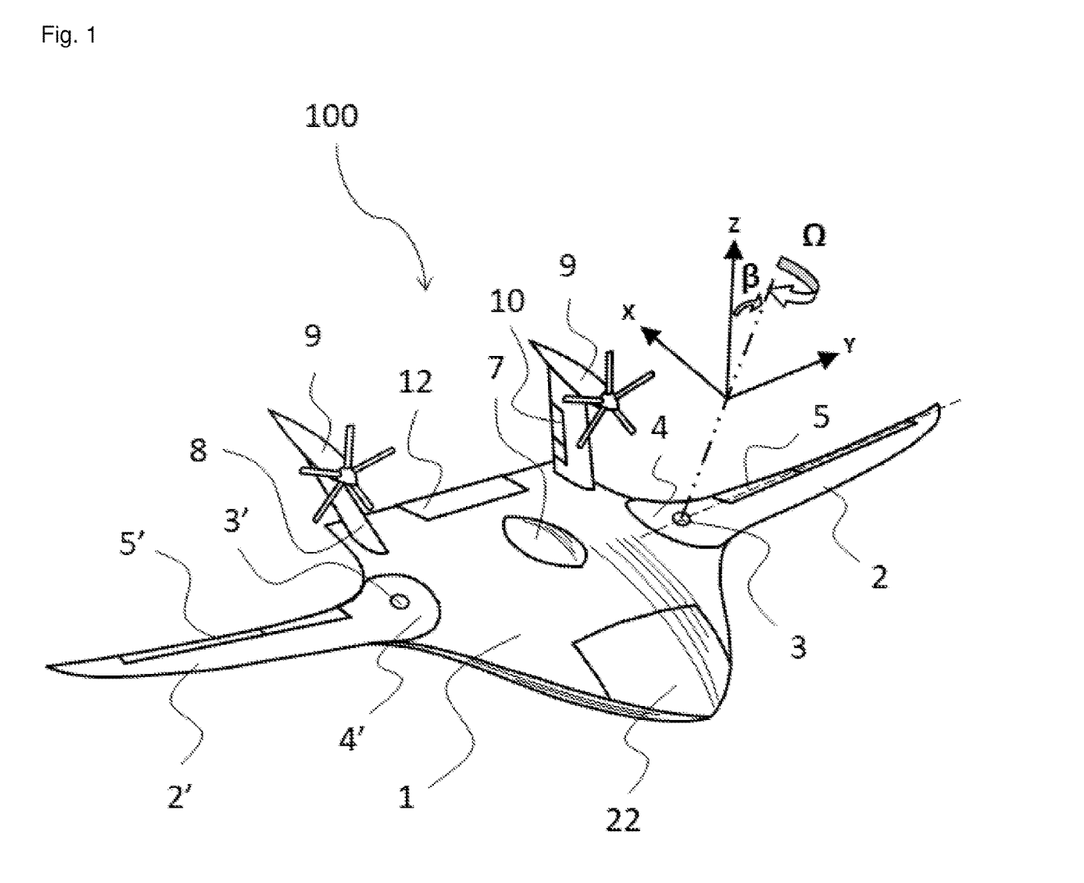
FIG. 1 is a front-top perspective view of ¾ of an aircraft in accordance with the present invention, with lateral wings in the level flight position and the representation of an X, Y, Z coordinate system.
Figure 3:
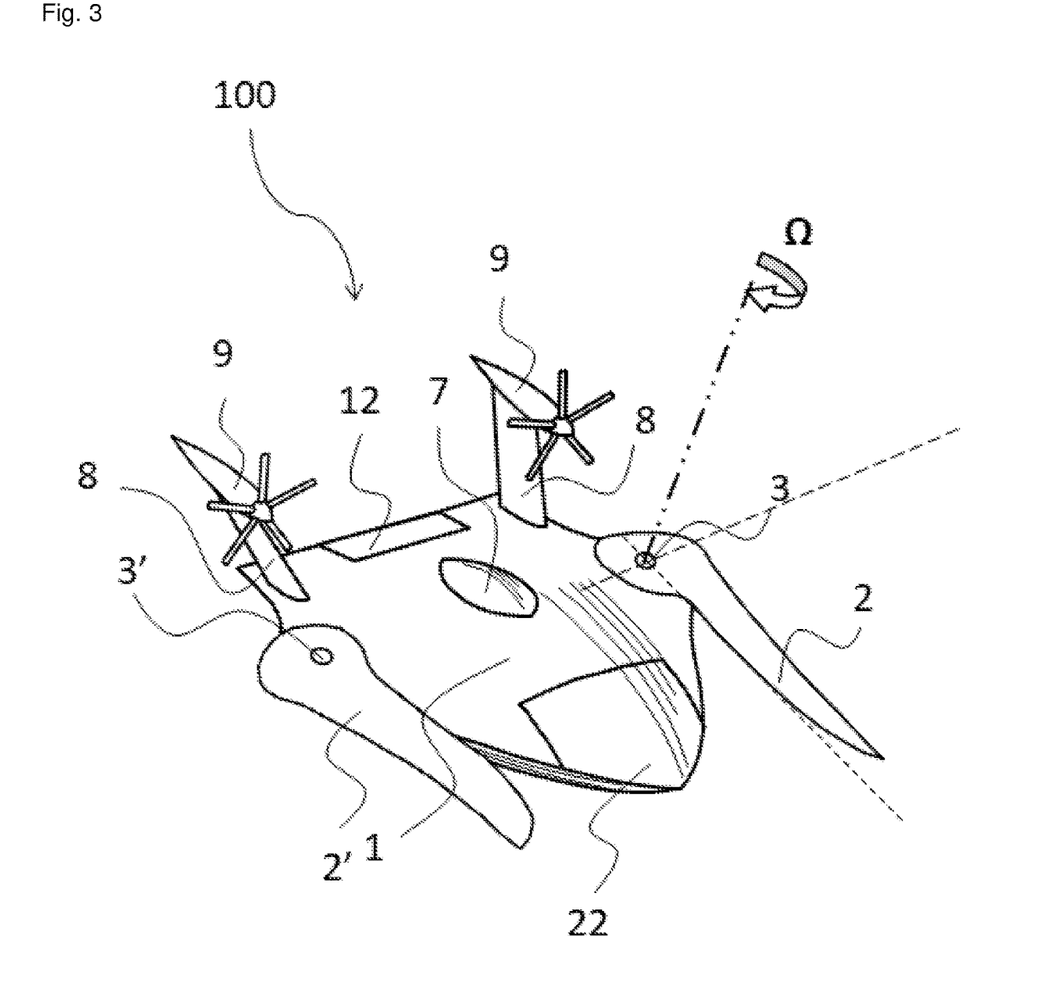
FIG. 3 is a view similar to FIG. 1 in which the wings are completely folded forwards, in the storage position.
Figure 4:
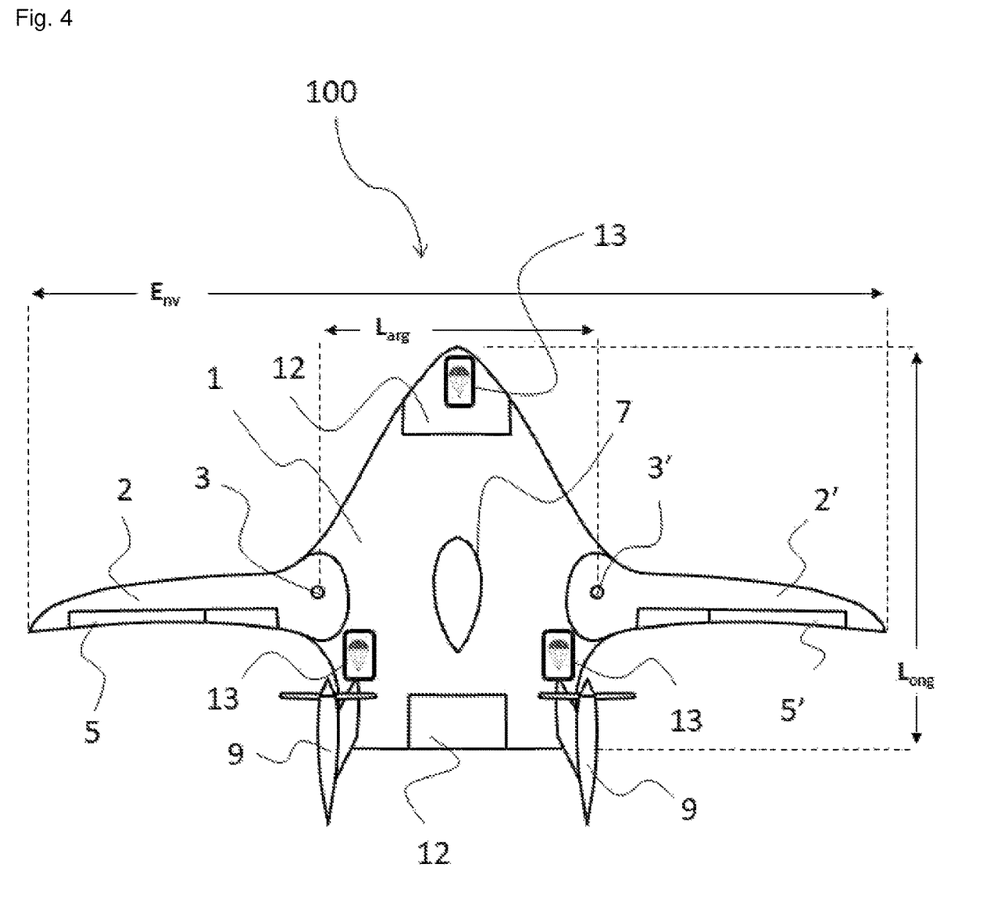
FIG. 4 is a top view of the aircraft of FIG. 1.

As shown in FIG. 1, the axes 3 and 3' are inclined by an angle β relative to the vertical Z. The rotation of the lateral wings 2 and 2' by an angle Ω about the axes 3 and 3' leads to the following considerations:

for angles of rotation −40°<Ω<+40°: a variation in flight of the relative angle of aerodynamic incidence between the lateral wings 2 and 2' and the central wing 1 accompanied by a change in the aerodynamic thrust center along the longitudinal axis X of the aircraft;

for angles of rotation Ω>70° or Ω<−70°: a storage of the lateral wings 2 and 2' forwards or backwards, in particular on the ground or on water.

The variations, of incidences and position of the thrust center, relatively between the central wing 1 and the lateral wings 2 and 2' allows choosing the distribution of the total lift between the lateral wings 2 and 2' and the central wing 1, these configurations being chosen according to the different phases of flight.

Figure 2:
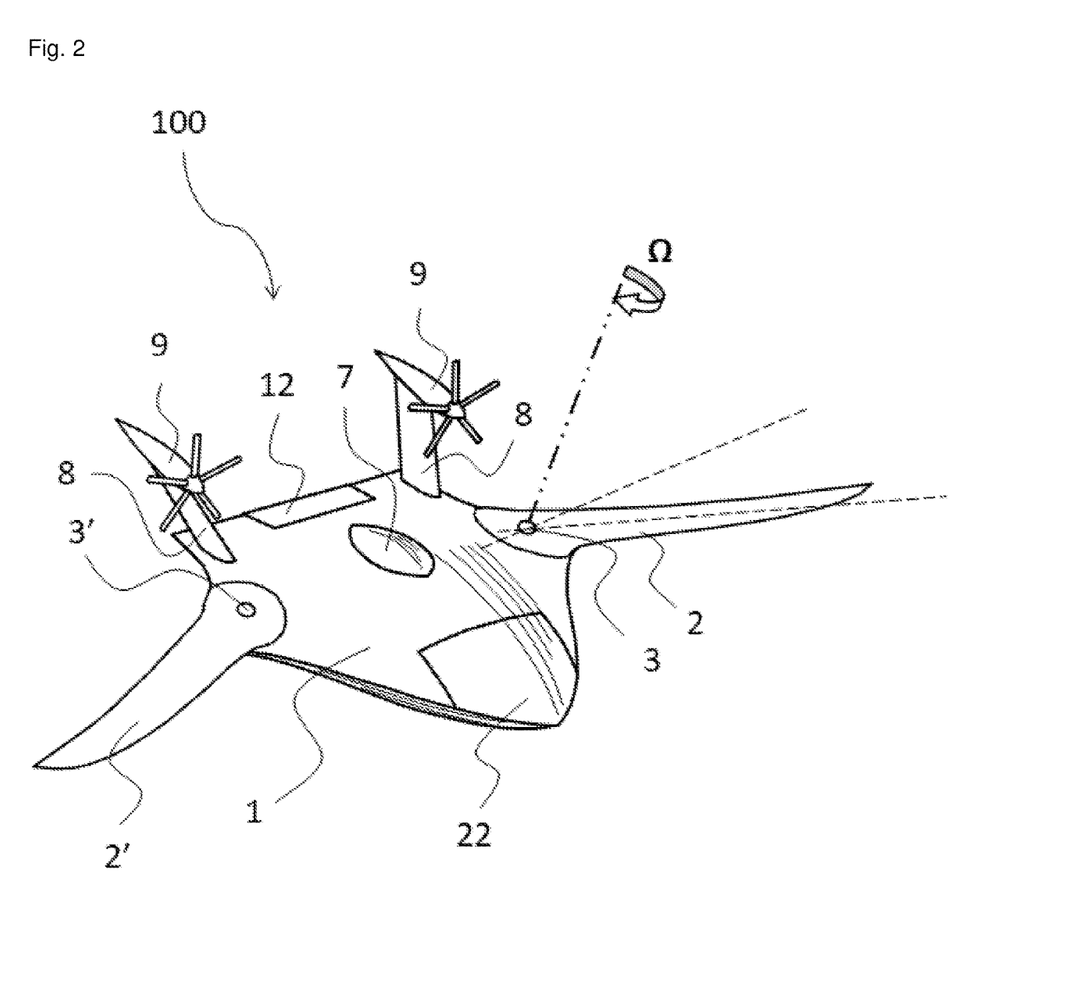
FIG. 2 is a view similar to FIG. 1 in which the wings are partially folded forwards, in the flight position during the landing and/or take-off phase of the aircraft.

At high relative angles of aerodynamic incidence of the aircraft (>10°), in particular for take-off and landing, a configuration is adopted with the lateral wings 2 and 2' which are pivoted so as to reduce their aerodynamic incidence angle to avoid the stalling of the lateral wings 2 and 2' and maintain the effectiveness of the roll control by the fins 5 and 5'. In this configuration, the central wing 1, of low elongation, close to the shape of a delta wing, supports a greater portion of the lift thanks to the vortices generated around it, while producing a stronger induced drag. The lift-to-drag ratio thus degraded is adapted to the landing phases.

In cruise flight, the lateral wings 2 and 2' are fully deployed ($\Omega=0°$), the three wings distribute the lift so as to maximize the lift-to-drag ratio, the lift distribution approaches an elliptical form.

The lateral wings 2 and 2' are each equipped with one or more rear control surfaces 5 and 5' ensuring the aerodynamic control of the aircraft 100.

Figure 5:
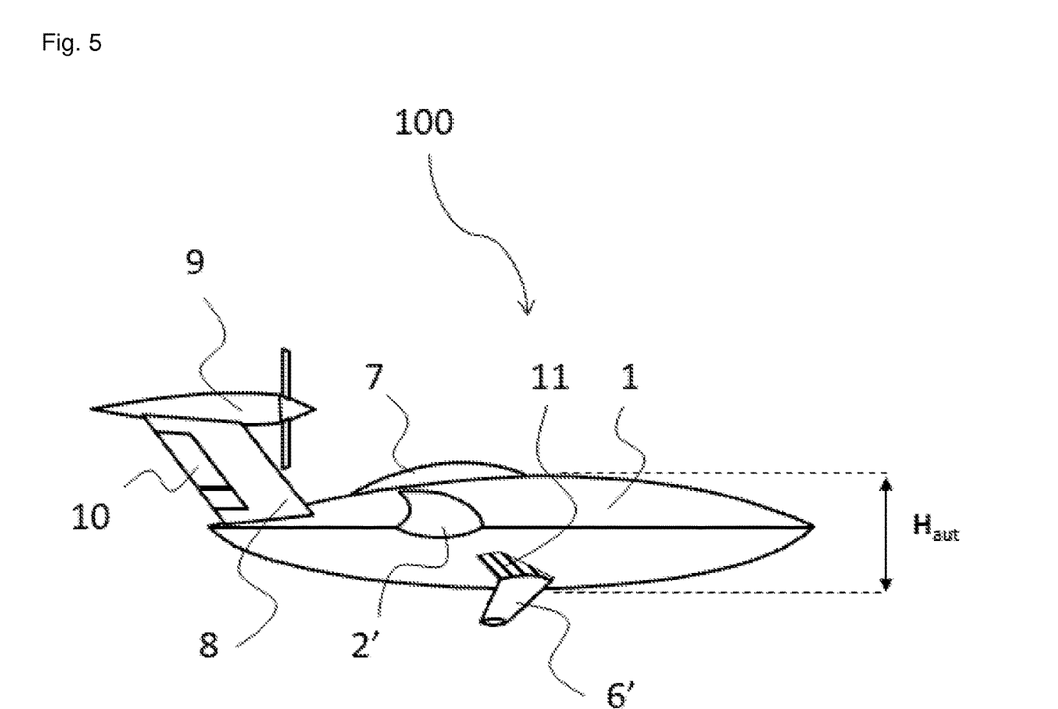
FIG. 5 is a side view of the aircraft of FIG. 4, with extended foil-type fins.
Figure 6:
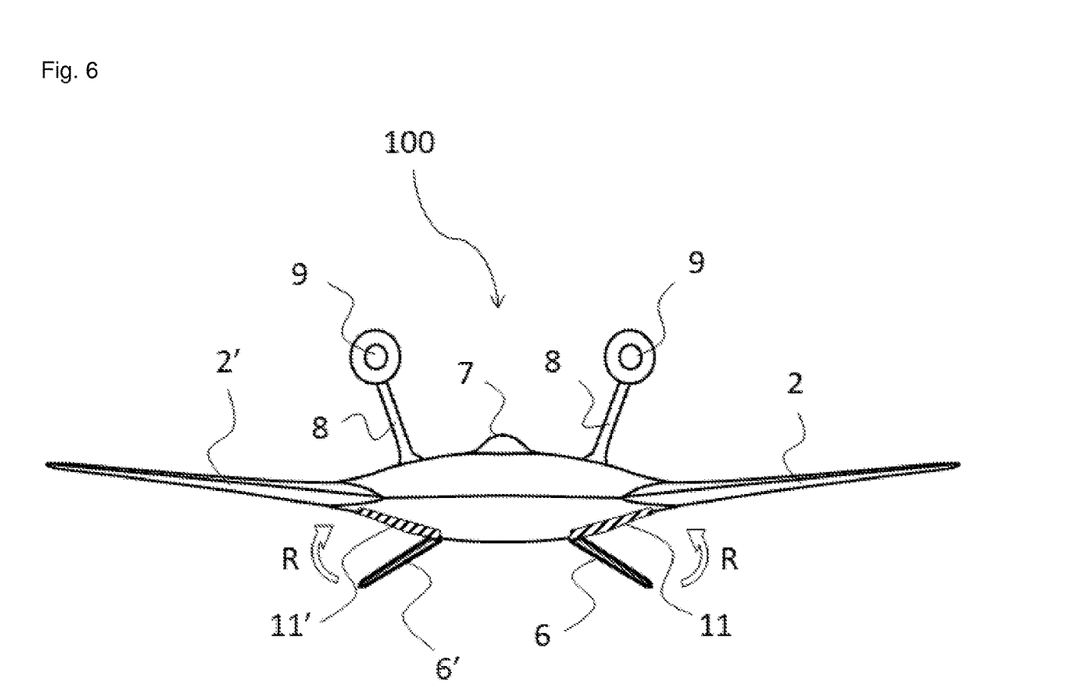
FIG. 6 is a front view of the aircraft of FIG. 5.

The aircraft 100 can also take off and land on water, thanks to at least two hydrofoils 6 and 6' located below the central wing 1. The hydrofoils 6 and 6' are retractable in respective housings 11 provided for this purpose in the central wing 1 (see arrows R). This allows reducing the drag in flight and enables low speed maneuvers in shallow water.

The central wing 1 includes a cockpit 7 located close to the lateral wings 2 and 2' on the longitudinal axis X. This allows controlling the whole vital elements of the aircraft 100 as well as the spacing on the ground or on water, the maneuvers in ports and airports are easier.

Figure 7:
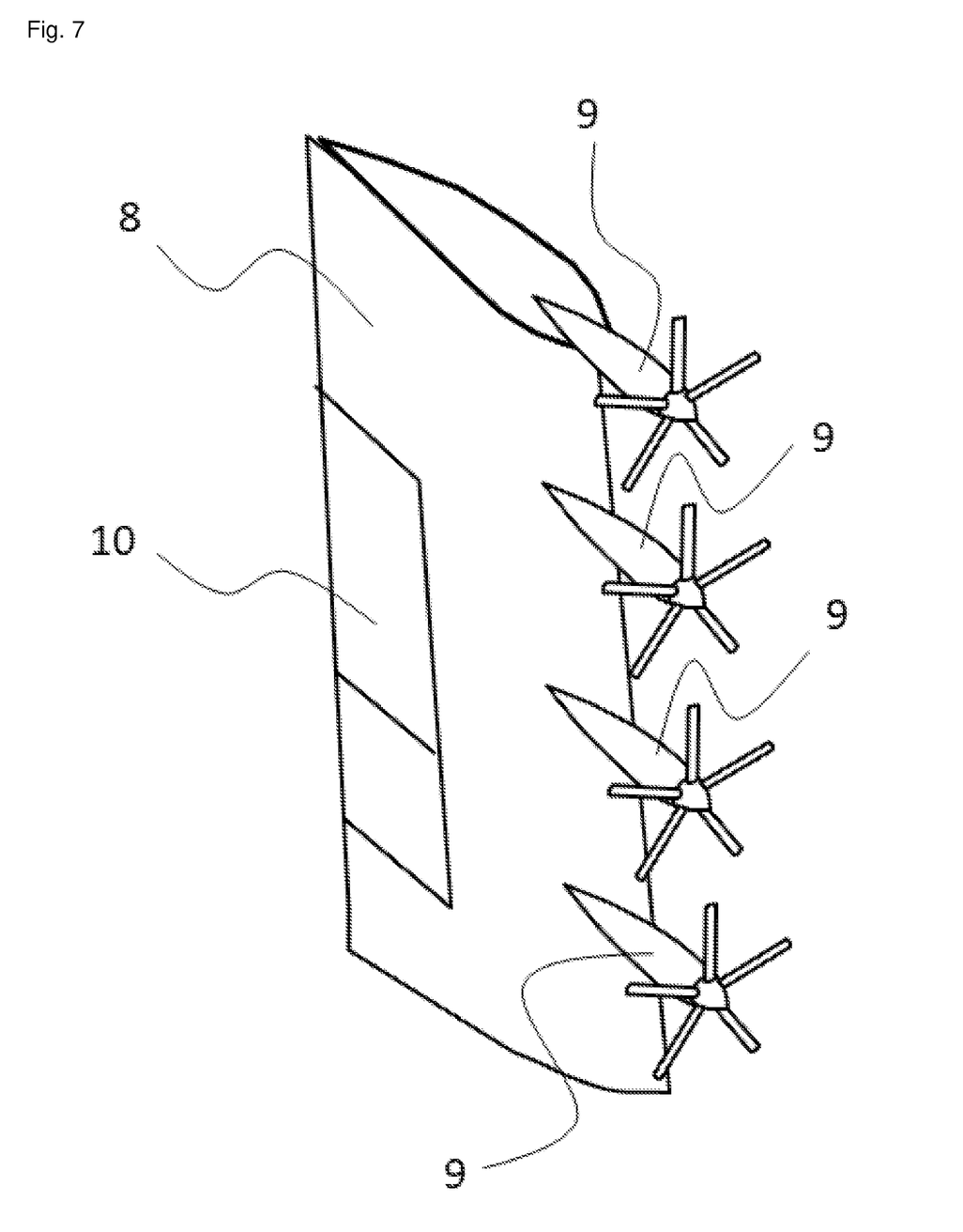
FIG. 7 is a detail view of a variant of a pylon of the aircraft of FIGS. 1 to 6.

The aircraft 100 is also provided with one or more pylons 8. Each pylon 8 supports thermal or hybrid electric powertrains 9. These pylons 8 incorporate rear control surfaces 10 for controlling the aircraft 100 in yaw and/or in pitch and/or in roll.

The rear of the central wing 1 is equipped with one or more access door(s) 12 which can be open upwards and or downwards. These doors 12 can be maneuvered on the ground, in flight, on water.

The central wing 1 is finally equipped with one or more emergency parachutes 13 distributed in the low volumes.

It should be understood that the detailed description of the object of the invention, given only by way of illustration, does not, in any way, constitute a limitation, the technical equivalents also being included within the scope of the present invention.

The invention claimed is:

1. An aircraft comprising a main fuselage composed of a central wing accommodating at least one of passengers and freight, two lateral wings pivoting on the central wing about respective axes of rotation, the central wing and the two lateral wings obeying the following geometric characteristics:

$$0.3 \times L_{ong} < L_{arg} < L_{ong};$$

$$0.11 \times L_{ong} < H_{aut} < 0.25 \times L_{ong};$$

$$E_{nv} > 1.4 \times L_{ong};$$

where:
- $L_{arg}$ being a distance between the two axes of rotation of the two lateral wings;
- $L_{ong}$ being a length of the central wing;
- $H_{aut}$ being a height of the central wing;
- $E_{nv}$ being a wingspan of the aircraft; and wherein the two axes of rotation of the two lateral wings are inclined by an angle β relative to a vertical axis of the aircraft, such that the two lateral wings pivot from rear to front and vice versa so as to come closer to, or be deployed on either side from, the main fuselage.

2. The aircraft of claim 1, wherein $10° < β < 50°$.

3. The aircraft of claim 1, wherein each of the two lateral wings comprise at least one aerodynamic control surface.

4. The aircraft of claim 1, wherein the two lateral wings pivot about the respective axes of rotation between a first extreme deployed flight position and a second extreme folded storage position of the aircraft, an amplitude of an angle Ω between the first extreme deployed flight position and the second extreme folded storage position being 70°.

5. The aircraft of claim 1, wherein the two lateral wings pivot about the respective axes of rotation between a first extreme deployed flight position and a second deployed intermediate take-off position, an amplitude of an angle Ω between the first extreme deployed flight position and the second deployed intermediate take-off position being 40°.

6. The aircraft of claim 1, wherein the two lateral wings pivot about the respective axes of rotation between a first extreme deployed flight position and a landing position, an amplitude of an angle Ω between the first extreme deployed flight position and the landing position being 40°.

7. The aircraft of claim 1, further comprising at least one pylon above the central wing supporting at least one of an electric propulsion or a thermal propulsion, said at least one pylon integrating at least one aerodynamic control surface.

8. The aircraft of claim 1, further comprising at least two hydrofoils below the central wing, said at least two hydrofoils being retractable in the central wing.

9. The aircraft of claim 1, further comprising at least one door at a rear end of the central wing or at a front end of the central wing.

10. The aircraft of claim 1, further comprising at least one cockpit on top of the central wing and located at a height of the two lateral wings.

11. The aircraft of claim 1, further comprising an emergency parachute inside the central wing.

* * * * *